March 3, 1970  D. E. CANTRILL  3,498,663
ADJUSTABLE VACUUM PLATEN
Filed Nov. 29, 1967  2 Sheets-Sheet 2
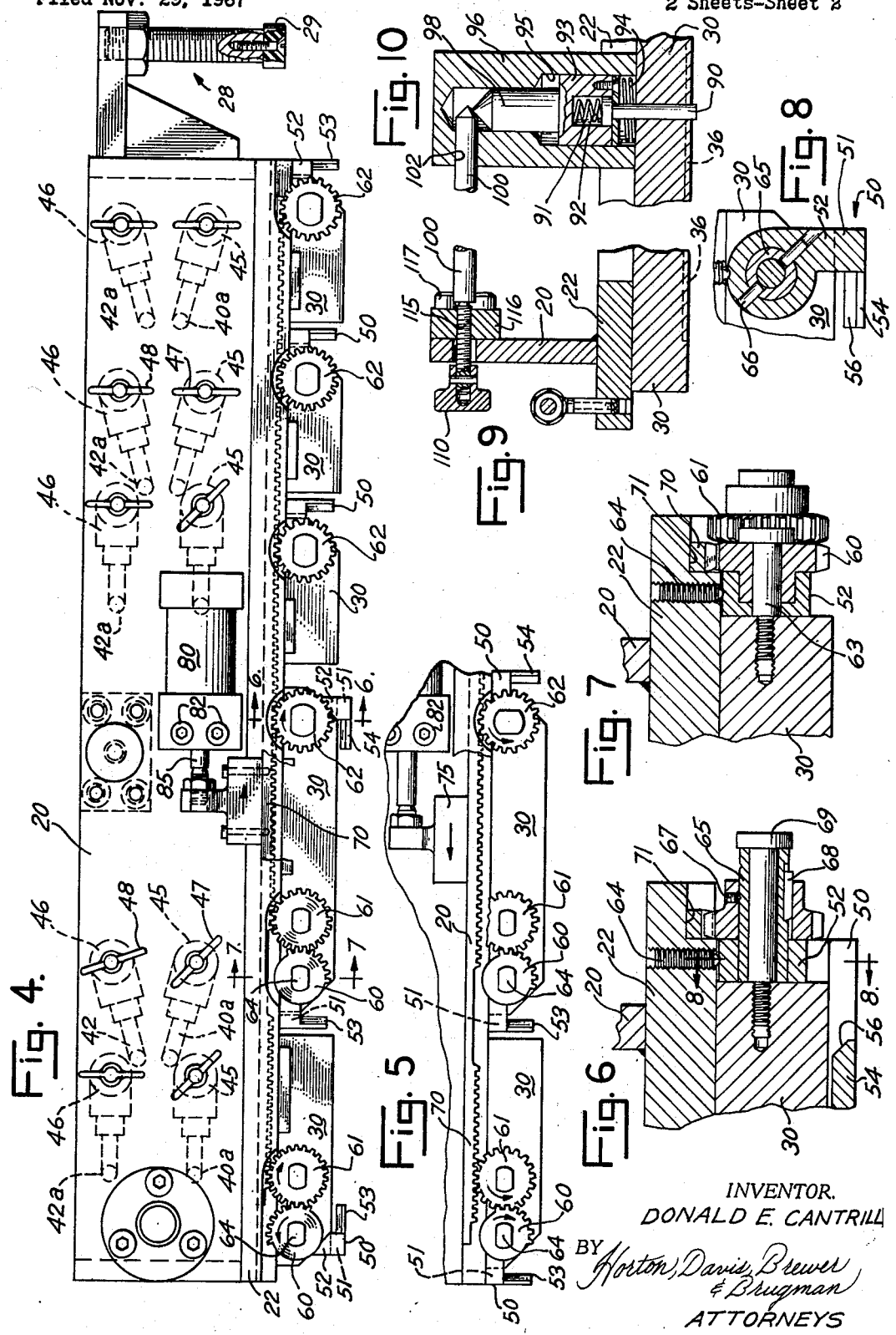
INVENTOR.
DONALD E. CANTRILL
BY Horton, Davis, Brewer
& Brugman
ATTORNEYS

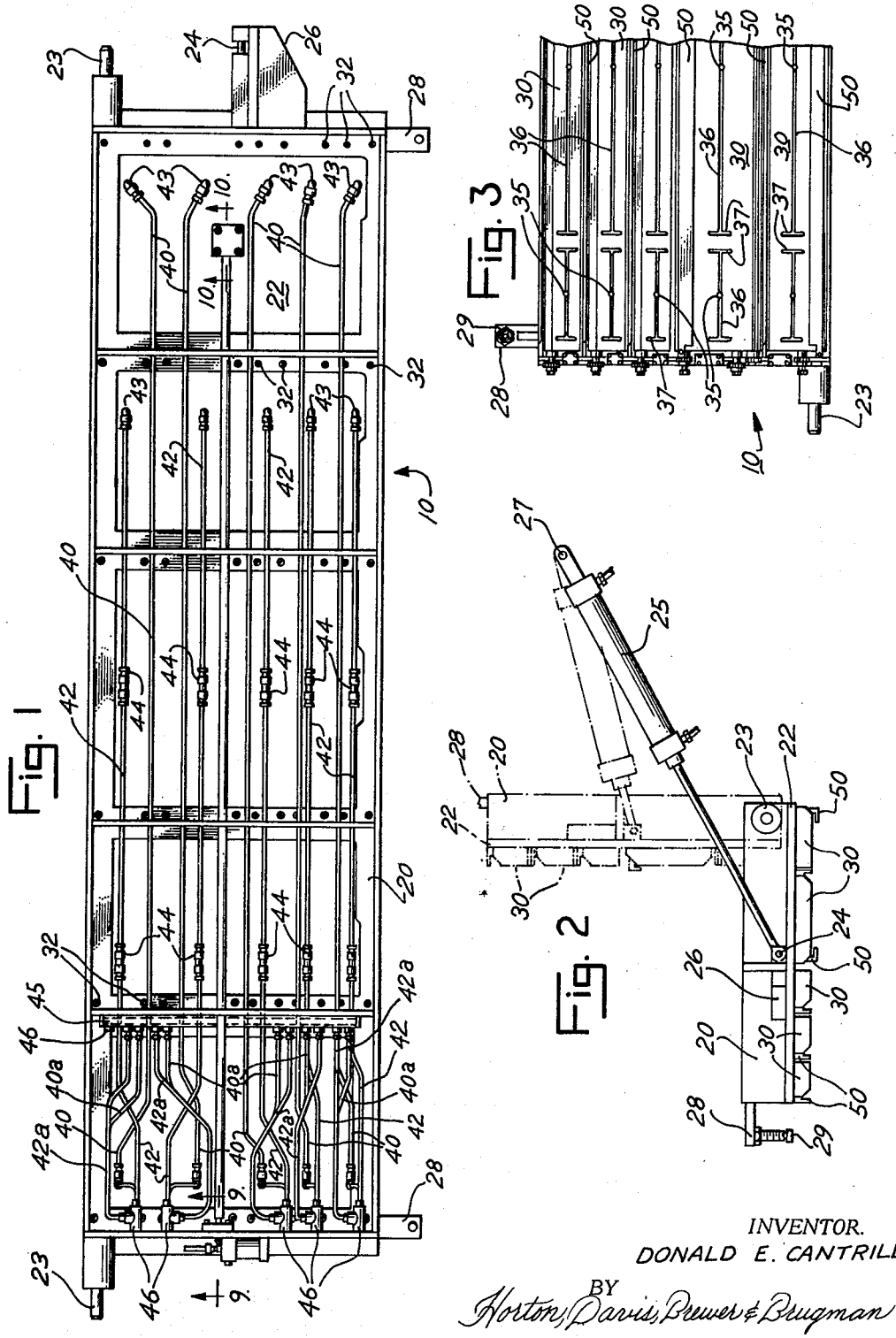

United States Patent Office 3,498,663
Patented Mar. 3, 1970

3,498,663
ADJUSTABLE VACUUM PLATEN
Donald E. Cantrill, East Moline, Ill., assignor, by mesne assignments, to Home Comfort Products Co., Princeville, Ill., a corporation of Illinois
Filed Nov. 29, 1967, Ser. No. 686,585
Int. Cl. A47b 97/00; B66c 1/02; B25j 3/00
U.S. Cl. 294—65        8 Claims

ABSTRACT OF THE DISCLOSURE

A vacuum platen pivotable between loading and horizontal dispositions for the application of a skin on a laminated product. An apertured vacuum holding surface is defined by a plurality of elongated segments, each having a pair of separate vacuum supply lines with shut-off valves to vary the vacuum surface area and accommodate various skin sizes. Prior to vacuum application, the skin is held by its longitudinal edges within elongated brackets. Pinions, one on each bracket, engage a pneumatically activated rack to pivot the brackets on longitudinal axes out of the way at the sides of each segment, so that the skin is held solely by vacuum at the horizontal disposition. The pinions may be disengaged as desired, and thus a pair of brackets may be chosen for a particular skin width.

BACKGROUND OF THE INVENTION

This invention relates generally to placement and positioning means, and more particularly, to an adjustable vacuum platen for machine application of a skin on a laminated product.

Mass production of many modern plastic products, such as foam-core plastic doors, panels, or the like, is highly desirable, and a high rate of production could be obtained by machine. My co-pending application Ser. No. 686,674, filed Nov. 29, 1967, discloses a fixture which makes possible the automatic assembly, clamping, pressurizing and unclamping of a laminated product during travel through a machine. It is, of course, desirable to provide for the automatic application of the final skin to the product, prior to clamping in the fixture. Further versatility permitting various product sizes, is also desirable. Thus, there is a need for a vacuum platen which correctly and quickly applies skins of various sizes, as desired, during the manufacturing process.

SUMMARY OF THE INVENTION

Therefore, to provide the foregoing and to overcome other difficulties of the prior art, the general object of this invention is to provide a new and improved adjustable vacuum platen for use in the automatic machine process of laminated products. To this end, the present invention provides a vacuum platen that is pivotable between a somewhat vertical loading disposition and a horizontal skin application disposition. A vacuum holding surface is defined by a plurality of elongated segments, each having a pair of separate vacuum supply lines with shut-off valves. One line supplies vacuum at a segment end length, while the other line supplies the remaining segment length. By proper choice of valves, the vacuum holding area can be limited for a desired skin size.

At the loading disposition, prior to vacuum application, the skin is held in position by a pair of elongated brackets embracing opposite longitudinal skin edges. Pinions on each bracket are slidable longitudinally on an extension thereof for engagement with a pneumatically activated rack. Rack activation pivots those engaged brackets on longitudinal axis to out of the way positions at the side of each segment. The disengaged brackets always remain at the out of the way positions. Thus, it is understood that choices of bracket spacing is available, corresponding to different skin widths.

After vacuum application, the engaged brackets are removed from the skin by automatic rack activation, so that a pivoting of the platen to the horizontal application disposition presents the skin horizontally over the product, held solely by the vacuum for placement thereon by vacuum release.

Thus, it is seen that the general object of this invention is the mass production of laminated products by machine.

An object of this invention is to provide a vacuum platen which may pivot from a loading to a horizontal disposition for automatic placement of a skin on a laminated product.

Another object of this invention is to provide a vacuum platen which is adjustable to various skin sizes.

It is an object to provide an adjustable and removable bracket to initially position the skin on the platen prior to vacuum application.

Yet another object is to provide a durable vacuum platen of simple operation which is economical to produce and which lends itself to standard, mass production manufacturing techniques.

Further and other objects, and a more complete understanding of this invention may be had by referring to the following description and claims, taken in conjunction with the accompanying drawings.

DESCRIPTION OF THE DRAWINGS

For the purpose of illustrating the invention, there is shown on the drawings, a form which is presently preferred, it being understood, however, that this invention is not necessarily limited to the precise arrangement instrumentalities there shown.

FIG. 1 is a plan view showing the back side of the invented vacuum platen.

FIG. 2 is an end view illustrating the loading and horizontal dispositions.

FIG. 3 is a partial plan view of the front side of the vacuum platen, showing the vacuum holding surface thereof.

FIG. 4 is an enlarged detailed end view of the vacuum platen shown in FIG. 1.

FIG. 5 is a partial end view showing a change of position from that shown in FIG. 4.

FIG. 6 is an enlarged partial cross-section taken along lines 6—6 of FIG. 4.

FIG. 7 is an enlarged partial cross-section taken along lines 7—7 of FIG. 4.

FIG. 8 is a cross-section of FIG. 6 taken along lines 8—8.

FIGS. 9 and 10 are enlargements of partial cross-sections taken along lines 9—9 and lines 10—10 of FIG. 1.

DESCRIPTION OF THE PREFERRED EMBODIMENT

Referring now to the drawings in detail, wherein like numerals indicate like elements, there is shown in FIG. 1, an illustration of the vacuum platen of the present invention designated generally at 10. As shown, the platen 10 has a rectangular flanged framework 20 which may be a casting or a welding of appropriate lengths of metal section. Rectangular sheet 22 is rigidly fastened to enclose framework 20, as shown, by suitable means, such as spot welding, to form a rigid yet lightweight structure. Axles 23 are provided at each end, to be journaled in a machine framework (not shown), so that the platen may be pivoted (as in FIG. 3), from a somewhat vertical loading disposition (shown in phantom) to a horizontal application disposition by a means, such as a hydraulic or pneumatic ram 25. The platen 10 and ram 25 are pivotally connected by pin 24 in sturdy yoke 26 extending outward from platen 10. The ram 25 is understood to be anchored at pivot 27 to the machine frame (not shown). Adjustable stop members 28 with resilient bumpers 29 seat on the machine framework (not shown) to assure that the platen is in the correct disposition.

A flat holding surface is defined by the elongated segments 30, which are supported on the framework 20 by machine screws 32 (visible only at FIG. 1) passing through both the framework 20 and sheet 22. Thus, segments 30 are removable and replaceable. As shown in FIG. 3, the segments 30 define a flat vacuum surface having apertures 35 which are centered within longitudinal grooves 36. Short lengths of horizontal grooves 37 cap the ends of each longitudinal groove 36 (as shown). The segments 30 are spaced apart (as shown).

With reference to FIGS. 1 and 4, conduit means are provided by a pair of separate supply lines 40, 42 for each segment 30. L-couplings 43 and T-couplings 44 are received by openings to apertures 35 through sheet 22. Each supply line 40 connects through a single L-coupling 43 at an end length of a segment 30, respectively. On the other hand, each supply line 42 connects through an L-coupling 43 and several T-couplings 44, along the remaining segment lengths, as illustrated in FIG. 1. A vacuum supply chamber 45 is provided for connection through an opening 46 to a source such as a vacuum pump, or the like (not shown). Each supply line 40, 42 is connected to chamber 45 by a short length of individual connecting conduit 40a and 42a leading through individual shut-off valves 45, 46. The plan view of FIG. 1 shows the valves in an overlying position, so that only valves 46 are visible. Thus attention is directed to the representation of FIG. 4 showing all the valves 45–46, each having individual control handles 47, 48, respectively. The lowermost valves 45 may be opened or shut by respective handles 47 to supply or cut off vacuum at the end lengths of each segment 30. The uppermost valves 46, likewise may be opened or shut off by handles 48 to control vacuum application at the remaining lengths of segments 30. It is clear that the vacuum area may be thus varied for a desired skin size.

Holding means for positioning the skin prior to the vacuum application are provided by elongated brackets 50 having an L-shaped section. Note that the base leg 51 of each L-section is rather short, sufficient to engage skin edges. Each of the brackets 50 is hung on arms 52 at each end. It is seen that the arms 52 provide extensions of base 51 thereat, pivotable on a longitudinal axis at the sides of the segments 30, as best illustrated by the detail of FIG. 8. Notice that two of the bracket L-sections have legs 53 which extend inward toward the right in FIG. 4. The remaining brackets 50 have legs 54 which extend inward toward the left in FIGS. 4 and 8. The end of each leg 53, 54 has an incline 56 (see FIG. 6) to assist in sliding in a skin between the respective brackets 50. Thus it is understood, as illustrated in FIG. 4, that a pair of brackets 50 having opposed legs 53, 54 embrace the longitudinal edges of a skin to hold it in position until vacuum is applied.

Release means for removal of the brackets 50 after vacuum application are provided by pinions 60, 61 and 62, which engage a rack 70 connected for activation by a pneumatic ram 80. Notice that the partially toothed pinion 60 has no direct engagement with rack 70. Instead, engagement is through an idler pinion 61, as indicated in FIGS. 4 and 5, in order to provide the rotational direction shown by the arrows. With reference to FIG. 7, an interlocking engagement of pinion 60 and arm 52 is secured between the flat head of screw 63 and an end of segment 30. As shown, the flat headed screw 60 has a threaded tip screwed into segment 30 and a smooth shank about which both arm 52 and pinion 60 pivot. The tap screw 64 extends through sheet 22 to bear against the peripheral groove in the rounded end of arm 52, as shown. Adjustment of the tap screw 64 provides sufficient frictional resistance so the brackets 50 remain at the out-of-the-way position between the segments 30, that is, until forcefully pivoted downward by pinions 60, 61 in engagement with rack 70.

The pinions 61, 62 are slidably axially outward for disengagement from the rack 70. In the case of idler pinion 61, it is journaled on segment 30 and also disengages from partially toothed pinion 60, as per FIG. 7. Other than that, axial disengagement is understood to be identical to that of pinion 62. Thus only the disengagement for pinion 62 will be described with reference to the cross-sectional FIGS. 6 and 8. The pinion 62 is tightly mounted on the tubular extension 65, which, in turn, is secured at one end of the bracket 50 by means of the key pins 66 through the rounded end of arm 62 (FIG. 8). The pinion 62 is able to slide axially on extension 65 between peripheral grooves engaged by tap screw 67, as indicated at FIG. 6. Adjustment of tap screw 67 provides proper amount of frictional resistance to axial sliding, as is well known. Though axially slidable, the pinion 62 and extension 65 are coupled for rotation together by a keyway 68. The extension 65 is journaled at an end of segment 30 by screw 69. A threaded tip of screw 69 is screwed into the end of segment 30, as shown. The extension 65, together with pinion 62 and arm 52, all pivot about the smooth shank of screw 69. Axial displacement of extension 65 is, of course, limited between the flat head of screw 60 and segment 30.

It is to be noted, as shown in FIGS. 4 and 5, that portions of the rack 70 are toothless. This is, it is noted, directly over the partially toothed pinions 60. Thus, when the idler pinions 61 are pulled outward for disengagement from rack 70 and from pinions 60, a complete disengagement is accomplished. Complete disengagement of pinions 62 is accomplished by merely pulling them outward.

Rack 70 is toothed along its length, except for portions over the pinions 60. A transverse channel 71 is provided in sheet 22 for slidable reception of rack 70, as may be visualized best with reference to the cross-section of FIGS. 6 and 7. Connecting block 75 is fastened by screws 76 to extend outward, as shown.

The pneumatic ram 80 is mounted on the end of frame 20 by screws 82. Threaded rod 85 is engaged within connecting block 75 to provide the connecting linkage between the rod 70 and 80.

Since the inward end of the platen may be inaccessible, it is desirable to provide a plunger to prevent sticking of the skin to the surface 30. Furthermore, it is desirable that the plunger be adjustable. Thus, plunger 90 is provided through an end length of the central segment 30, as shown in FIG. 10. The plunger 90 is biased downward by spring 91 within cavity 92 in the piston 93. A spring 94, of lesser strength, biases the piston 93 upward in the cylinder 95 within the block 96 mounted on sheet 22, at the back of platen 10, as shown in FIG. 10. Piston 93 has an extending rod portion 98 terminating in a cone. A horizontal rod 100 with a similar cone-like tip extends through a perpendicular bore 102 in block 96, as shown. The outward end of rod 100 is journaled through frame 20, as shown in FIG. 9. Rod 100 terminates in a handle portion 110 and has a screw length 115 in engagement in the topped nut member 116 secured on frame 20 by screws 117. Thus, by turning the handle 110, the rod will travel by virtue of the screw engagement either inward or outward to force the cone-shaped tip against the cone of rod portion 98 and move the piston 93 upward or downward. This, of course, varies the tension between springs 92, 94 for an adjustment of the bias force on plunger 90.

For placement of a skin on a laminated product, the vertical loading position, shown in phantom in FIG. 2 is assumed automatically by virtue of pneumatic ram 25. A vacuum holding surface area corresponding to a desired skin size, is provided by turning the valve handles 47, 48 to shut off appropriate valves 45, 46. A pair of brackets 50, spaced according to the desired skin width, are chosen by engaging appropriate pinions 61 and 62. The remaining brackets remain at out-of-the-way positions at the sides of segments 30 by virtue of frictional resistance of tap screws 64. Then a skin may be manually slid inward between the legs 53, 54 and the vacuum surface defined by segments 30. In this manner, the skin is held in position until vacuum is applied. On application of vacuum, the skin will be drawn up and held by the vacuum. Then the brackets 50 may be removed at any time thereafter. This may be accomplished by known control systems in the machine (not shown) to activate the pneumatic ram 80 moving the ratchet 70 from the position shown in FIG. 4 to the left, as in FIG. 5. The engaged pinions 61, 62 rotate counterclockwise. This directly pivots brackets 50 with leg 54 upward between the segments 30. A clockwise rotation of the pinion 60 results and bracket leg 53 simultaneously pivots out of the way, as shown in FIG. 5. Then the platen 10 may pivot downward to the horizontal disposition shown in FIG. 2 where the skin is held solely by the vacuum. All remains for placement of the skin on a laminated product directly below is for the release of the vacuum, which again is automatically accomplished by known control systems of the machine (not shown).

The longitudinal and transverse grooves 36, 37, spaced as shown in FIG. 3, evenly spread the vacuum, so that the skin is held flat against the segment 30. Upon release of the vacuum the skin will drop downward on to the product. Plunger 90, biased outward by spring 92, assures that the outermost end of the skin will drop outward without sticking.

I claim:

1. An adjustable vacuum platen for automatic placement of a skin on a laminated product, comprising in combination: a framework movable between a loading and a utilization disposition in different planes; a flat holding surface supported by said framework, said surface including apertures therethrough; conduit means in communication with said apertures for recurrent vacuum application thereat; holding means for positioning said skin at said surface in said loading disposition prior to said vacuum application; said holding means being elongated brackets embracing opposite longitudinal edges of said skin, said brackets being pivoted on longitudinal axes and having angle sections with opposed legs spaced from said surface to hold said skin therebetween; and release means for removal of said holding means after said vacuum application, whereby movement of said platen to said utilization disposition presents said skin to said product, held solely by vacuum for said placement thereon by vacuum release, said release means including pinions affixed on said brackets coaxial with said axes, a rack in engagement with said pinions, and activating means for lineal movement of said rack to rotate said pinions and pivot said brackets apart, removing said legs outwardly from said skin.

2. A vacuum platen in accordance with claim 1, wherein said activating means is a pneumatic ram with a piston linked for movement of said rack.

3. A vacuum platen in accordance with claim 2, wherein said surface is defined by a plurality of spaced longitudinal segments, said brackets at both sides of each of said segments, with said legs thereof pivotable out of the way at sides of said surface and between said segments.

4. A vacuum platen in accordance with claim 3, wherein said pinions are slidable axially out of said engagement with said rack, whereby a pair of said brackets may be selected in a combination thereof for a desired skin width by engaging only particular pinions thereof with said rack, the remaining brackets being disposed with said legs pivoted out of the way.

5. A vacuum platen in accordance with claim 4, wherein said conduit means includes a pair of supply lines for each of said segments, one of said lines being for said vacuum application at a segment end length, the other of said lines being for said vacuum application along the remaining segment length, and said valve means being separate valves, one for each of said lines, whereby certain of said lines may be disconnected to accommodate a various length and width of said product.

6. A vacuum platen in accordance with claim 5, wherein said surface has long longitudinal grooves along the center of each of said segments, and short transverse grooves at each end of said longitudinal grooves, one of said apertures being at the center of each of said longitudinal grooves to evenly spread said vacuum application.

7. An adjustable vacuum platen for placement of a skin on a laminated product and comprising, in combination: a framework hingedly mounted for swinging movement relative to a longitudinal and relatively horizontal axis between an upright loading position and a relatively horizontal utilization position; means presenting a series of flat holding surfaces secured to and carried by the framework, said holding surfaces comprising a plurality of segments of predetermined widths extending longitudinally of the framework and having spaces of predetermined widths therebetween, said segments having apertures therein; conduit means in communication with said apertures for recurrent vacuum application thereat; holding means in the form of angle brackets extending longitudinally of said segments in said spaces and providing pairs of surfaces along which said skins are slidable for loading in a position overlying said holding surfaces prior to the vacuum application, and release means for moving said holding means into said spaces after said vacuum application, whereby said skin is retained against the holding surface by vacuum during swinging movement of the platen between the loading and utilization positions and is subject to release from the holding surface by release of the vacuum.

8. An adjustable vacuum platen as defined in claim 7, and further characterized by means for selecting said holding means in pairs at different distances apart laterally of said segments for accommodating skins of different widths.

References Cited
UNITED STATES PATENTS

| 1,110,409 | 9/1914 | Southerland | 294—65 |
| 1,125,752 | 1/1915 | Smith | 294—65 |
| 3,033,382 | 5/1962 | Noble | 294—65 |
| 3,379,466 | 4/1968 | Hughes | 294—65 |

HARVEY C. HORNSBY, Primary Examiner

U.S. Cl. X.R.

156—241, 237; 214—1